July 15, 1969  W. SCHELKMANN  3,455,753
TREAD FOR RECAPPING TIRES AND METHOD OF APPLICATION OF THE TREAD
Original Filed Oct. 20, 1964  2 Sheets-Sheet 1

INVENTOR
Wilhelm Schelkmann
BY Michael S. Striker
ATTORNEY

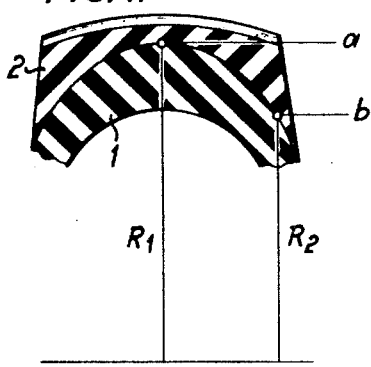
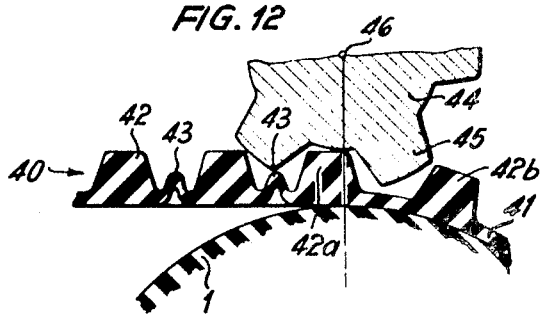
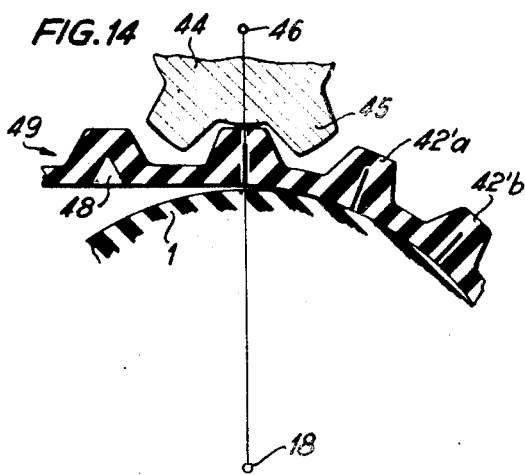
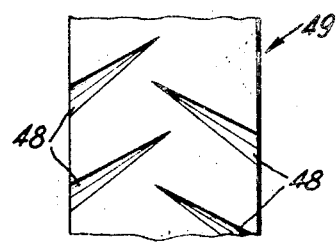
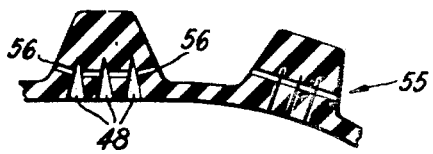
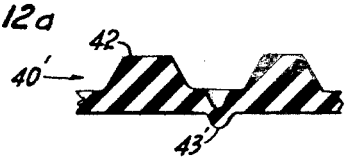

United States Patent Office 3,455,753
Patented July 15, 1969

3,455,753
TREAD FOR RECAPPING TIRES AND METHOD OF APPLICATION OF THE TREAD
Wilhelm Schelkmann, Witten (Ruhr), Germany, assignor to VV International Limited, Nassau, Bahamas
Original application Oct. 20, 1964, Ser. No. 405,045. Divided and this application Oct. 23, 1965, Ser. No. 503,243
Int. Cl. B29h 17/37; B60c 11/04
U.S. Cl. 156—96                    3 Claims

ABSTRACT OF THE DISCLOSURE

In a method of recapping a tire having an outer surface curved transverse to the circumference of the tire, in which a strip-shaped tread provided with a plurality of contractable and expandable means extending transverse to the longitudinal direction of the strip-shaped tread and spaced in the longitudinal direction from each other is wrapped about the outer surface of the tire and in which, in order to compensate for the circumferential greater length such a tire has in a plane of symmetry normal to the tire axis than at opposite side portions thereof, all of the contractable and expandable means are expanded in the region of the plane of symmetry and/or contracted at portions thereof covering side portions of the tire.

---

The present application is a division of my copending U.S. patent application Ser. No. 405,045, now U.S. Patent 3,285,795, entitled, "Tread for Recapping Tires and Method of Application of the Tread," filed on Oct. 20, 1964.

The present invention relates to a tread for recapping tires and a method of application of the tread to the outer surface of a tire to be recapped prior to vulcanization of the tread to the tire.

It is known to recap tires with prevulcanized profiled treads by means of a layer of binder material sandwiched between the outer surface of the tire and the tread, in which the parts to be united by vulcanization are wrapped in a flexible air-tight cover sheet so that the cover sheet forms a closed wrapper over the parts, and in which air and other gases are removed from the closed wrapper so that the parts will be pressed by atmospheric pressure substantially without clearance against each other. The thus assembled parts enclosed air-tightly in the wrapper are then subjected in an autoclave to heat and pressure, whereby the tread is permanently bonded to the outer tire surface by the layer of binder material.

Such a method is for instance disclosed in the U.S. Patent 2,966,936 and such a method is also disclosed in the copending application Ser. No. 364,385, now U.S. Patent No. 3,190,686.

Considerable difficulties are encountered in such a method of recapping tires to positively prevent any air enclosure between the bottom surface of the tread and the outer tire surface during application of the tread to the outer tire surface, especially if the bottom surface of the tread is curved in direction transverse to its elongation.

Another difficulty arises from the fact that the outer tire surface, curved in direction transverse to its circumference, has in a plane of symmetry of the tire normal to the tire axis a circumference of a greater length than the circumference of the tire at the opposite side portions thereof. When an elongated tread is wrapped around the outer tire surface, the central portion of the tread will extend over a portion of the outer tire surface having a greater circumferential length than the side portions of the tread and therefore, the central tread portion has to be expanded or the side portions have to be contracted to compensate for the difference in the circumferential length of the outer tire surface, which will create in a tread of known construction undue stresses in the tread which will detrimentally affect its wear and/or the bond between the inner tread surface and the outer tire surface to be recapped.

It is an object of the present invention to overcome these difficulties during application of a tread to the outer surface of the tire to be recapped and during subsequent bonding of the tread to the tire surface.

It is a further object of the present invention to provide for a tread or tread sections to be applied and subsequently to be bonded to a worn outer tire surface, which are constructed in such a manner that air enclosures between the inner tread surface and the outer tire surface during application of the tread or tread sections to the outer tire surface is positively prevented.

It is an additional object of the present invention to provide for an elongated tread which can be applied to the outer tire surface and which is constructed in such a manner that the difference between the circumferential length of the outer tire surface in a plane of symmetry of the tire normal to the tire axis and the circumferential length at the side portions of the tire can be easily compensated for without creating in the tread undue stresses which would detrimentally affect its wearing quality as well as the bond between tread and tire.

Finally, it is also an object of the present invention to provide for a method in which the tread is properly applied to the tire surface before bonding the tread to the tire and without creating in the tread any undue stresses.

With these objects in view, the tread section according to the present invention for recapping a tire having an outer surface of a predetermined curvature transverse to the circumference of the tire is provided with an inner surface which is curved in direction transverse to the elongation of the tread section along a radius of curvature which is greater than that of the tire. Preferably, the inner surface of the tread is also curved in direction of its elongation along a radius of curvature which is greater than that of the tire in the aforementioned direction. When a tread having an inner surface curved as set forth above is applied against the worn outer tire surface, a central portion of the tread will first engage the outer tire surface so that as the inner tread surface is subsequently applied over its whole area to the outer tire surface any air between the inner tread surface and the outer tire surface will be gradually squeezed out between the surfaces so that air enclosures between these surfaces are positively avoided.

According to the present invention the tread may also be formed with a plurality of expandable and contractable means, for instance folds, extending spaced from each other and transverse to the elongattion of the tread so that during application of the tread about the tire the difference between the length of the circumference of the outer tire surface in a plane of symmetry of the tire normal to the tire axis and the length of the circumference at side portions of the outer tire surface may be compensated for by expanding or contracting the folds in the tread so that the tread may be properly applied to the outer tire surface without creating undue stresses in the tread.

According to the method of the present invention, successive folds are evenly contracted or expanded so that the spacing of projections on a profiled tread will not be substantially changed during application of the tread to the outer tire surface.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 11 is a schematic view showing in cross section part of a tire and the tread to be applied thereto;

FIG. 12 is a partial cross sectional view showing the application of a tread to the outer tire surface by means of a pressure roller in which the tread is provided with folds;

FIG. 12a is a partial cross sectional view of another tread which may be applied with a pressure roller;

FIG. 13 is a partial bottom view of a tread similar to that shown in FIG. 12;

FIG. 14 is a sectional side view similar to that shown in FIG. 12 and showing a modified tread during its application onto the outer surface of a tire;

FIG. 15 is a partial side view of a tread similar to that shown in FIG. 14; and

FIG. 16 is a partial section of a tread similar to that shown in FIG. 15.

Figure 1:
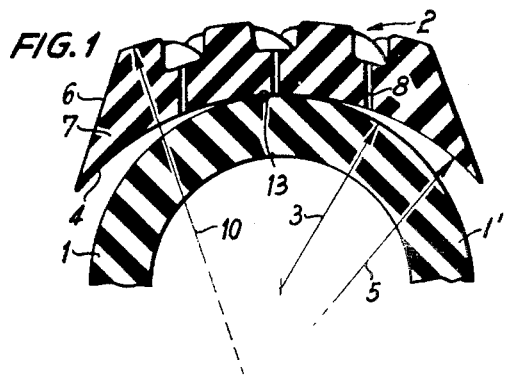
FIG. 1 is a partial cross sectioinal view of a tire to be recapped and a tread section placed against the outer tire surface, the section through the tire being taken along a plane including the tire axis.
Figure 2:
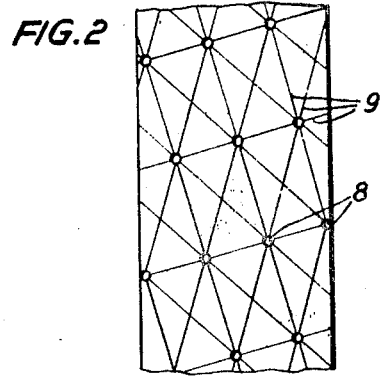
FIG. 2 is a bottom view of the tread section drawn to a smaller scale.
Figure 3:
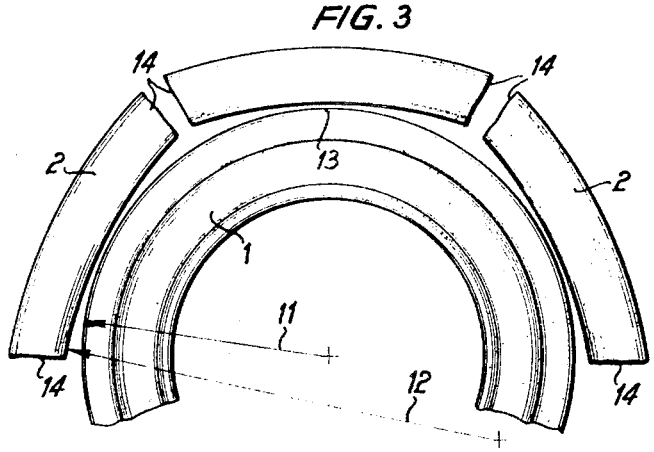
FIG. 3 is a partial side view of a tire and a plurality of tread sections placed against the outer tire surface.

Referring now to the drawings and more particularly to FIGS. 1–3, it will be seen that the tire 1 to be recapped has an outer tire surface 1' which is curved in a plane including the tire axis along a radius of curvautre 3. The tread section 2 to be applied against the outer tire surface 1' and to be subsequently bonded thereto has a bottom surface 4 curved along a radius of curvature 5 which is greater than the radius 3. As shown in FIG. 3 a plurality of sections 2 are placed about the circumference of the tire so that the end faces 14 of the sections may abut against each other and be bonded to each other after the sections 2 are applied against the outer tire surface. The bottom surface of each section 2, as initially formed, is also curved in longitudinal direction along a radius of curvature 12 which is greater than the radius 11 of the tire. When the tread sections 2, as initially formed are placed against the outer tire surface, the bottom surface 4 of each tread section will engage the worn tire surface 1' to be recapped substantially along a point 13 which is located midway between the end faces 14 of each section and midway between the side faces 6 thereof.

When the sections 2 are now pressed against the worn tire sufrace 1' so that the bottom face 4 of each section engages over its whole area the worn out tire surface 1', any air between the surfaces 4 and 1' will be gradually pressed out from the central portion 13 of the tread at which the bottom surface 4 initially engages the worn tire surface 1' toward the outer edges of the tread so that air enclosures between the surfaces 4 and 1' during tight application of the bottom surface 4 of the tread against the worn out tire surface 1' are positively avoided.

Preferably, the tread 2 is also formed with a plurality of bores 8 therethrough, as best shown in FIGS. 1 and 2 and the bottom ends of these bores may also be connected by a network of grooves 9, as shown in FIG. 2, to further facilitate escape of air from the space between the surfaces 4 and 1' during tight application of the bottom surface 4 of the tread against the outer worn surface 1' of the tire.

Each of the treads has preferably side faces 6 inclined at an acute angle to the bottom surface 4 so as to form on each tread-wedge-shaped side portions 7 as best shown in FIG. 1. The outer surface of the tire, as initially produced is preferably curved in direction transverse to the elongation of the tread along a radius of curvature 10 which is greater than the radius of curvature 5 of the bottom surface 4 of the tread.

The tread sections 2 are preformed and/or prevulcanized with the aforementioned radii of curvature in a mold and subsequently cooled. The sections are then removed from the mold and heated without being confined at low temperature in a pressurized fluid such as vapor, air, water or glycerine. The thus produced mold sections will resiliently contain the original shape to which they are molded during subsequent storage of the sections.

Instead of forming the tread sections with a width substantially equal to the widths of the tire to be recapped, it is also possible according to the present invention to provide two or three tread sections to be placed side by side to cover the widths of the tire and such modifications are shown in FIGS. 4–10.

Figure 4:
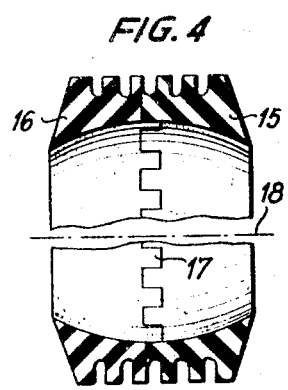
FIG. 4 is a partial sectional view of a further modification showing a pair of tread sections to be applied to a tire.

According to FIG. 4 the tread is formed by a right part 15 and a left part 16, as viewed in FIG. 4, each covering substantially half of the width of the tire to be recapped and each of the tread parts 15 and 16 has an inner side face 17 of castellated configuration so that parts of each side face extend normal and parts parallel to the axis 18 of the tire to be recapped. When the parts 15 and 16 of the tread are applied to the tire the castellated side faces 17 will interengage with each other as shown in FIG. 4.

Figure 5:
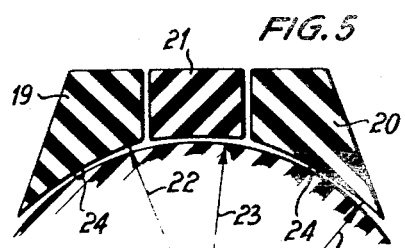
FIG. 5 is a partial cross sectional view of an additional modification showing a plurality of tread sections placed side by side on the outer tire surface.

Instead of forming the tread from two parts, it is also possible to form the tread out of three parts as shown in FIG. 5, which illustrates a pair of side parts 19 and 20 and a central part 21 sandwiched between the side parts. Each of the side parts 19 and 20 has a bottom face curved along a radius of curvature 22 which is greater than the corresponding radius of curvature 23 of the outer tire surface so that the side parts 19 and 20 will initially enage the outer tire surface at a central portion 24 as indicated in FIG. 5. The bottom face of central portion 21, on the other hand, may be straight in a cross section extending transverse to the elongation of the central part.

Figure 6:
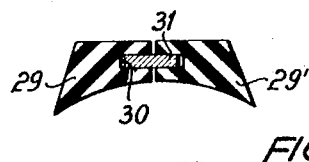
FIG. 6 is a view similar to FIG. 5 and showing a modification of tread sections to be placed side by side on a tire.
Figure 7:
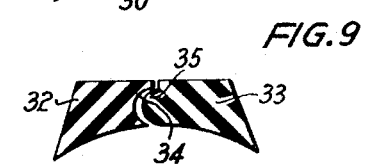
FIG. 7 is a cross sectional view of a tread section which may be placed between the tread sections of FIG. 6.

Further tread modifications according to the present invention in which the tread is formed out of two or more parts are shown in FIGS. 6–10. FIG. 6 shows an arrangement in which the left part 25 of the tread is formed at an upper inner portion thereof with a cutout 25' to form at the lower inner portion therof a projection 25", whereas the right part 26 is formed at a lower inner portion thereof with a cutout 26' resulting in a projecting portion 26" at an upper inner portion of part 26. If the tread parts 25 and 26 are to be applied against a tire of relatively small width the projecting portions 25" and 26" will be placed in the corresponding cutouts 25' and 26', or if the tread is to be used on a tire of relatively great width, a third intermediate part 27 as shown in FIG. 7 may be sandwiched between the left and right part 25 and 26 shown in FIG. 6 with the projection 28 of the intermediate part 27 located in the cutout 25' and the projection 28' located in the cutout 26'.

Figure 8:
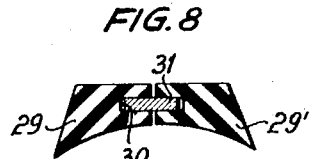
FIG. 8 is a cross sectional view similar to FIG. 5 showing a pair of tread sections to be placed side by side on the outer tire surface and an insert connecting the tread sections.

A further modification is shown in FIG. 8 in which the left part 29 and the right part 29', as viewed in FIG. 8, are each formed with a groove 30 of substantially rectangular cross section extending from the inner side face of each part thereinto and an insert 31 formed from the same or similar material as the parts 29 and 29' may be inserted in the groove 30 formed in the two parts so as to substantially fill the grooves.

Figure 9:
FIGS. 9 and 10 are cross sectional views similar to FIG. 8 and showing further modifications of a pair of tread sections to be placed side by side on a tire.

A further modification is shown in FIG. 9 in which the left part 32, as viewed in FIG. 9, is formed with a concavely curved inner side face 34, whereas the right part 33 is formed with a convexly curved side face 35 projecting into the groove formed by the concavely curved side face 34 of the left part 32.

Figure 10:
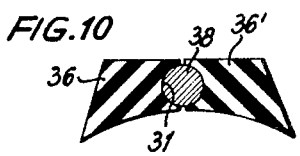

FIG. 10 shows an additional modification in which the left part 36, as viewed in FIG. 10, as well as the right part 36' are each formed with a concavely curved inner side face 37 of substantially semicircular configuration and in which an insert of substantially circular cross section is sandwiched between the left and right part and substantially filling the grooves formed by the concavely curved inner side faces 37.

It is to be understood that the bottom faces of the parts 15, 16, 25, and 26, 29 and 29', 32 and 33, and 36 and 36' are initially formed with a curvature as explained above in connection with FIGS. 1 and 5.

The tread parts shown in FIGS. 4–10 may be initially molded and processed in the manner as described above either in strip form or in circular form. When manufactured in strip form the strip may be cut to a length substantially equal to the maximum circumference of the tire to be recapped or the strip may be formed in several sections as indicated in FIG. 3 which are then preferably curved in longitudinal direction and in the manner as described in connection with FIG. 3. Likewise, when the tread is initially molded in circular form, the parts may be made in form of a plurality of ring segments or as integral annular members.

As mentioned above, it is also an important feature of the present invention to provide for a tread by means of which the difference between the circumferential length of the outer tire surface at the plane of symmetry of the tire normal to the tire axis and the circumferential length at the side portions of the tire can be compensated for. This is especially important in treads which are manufactured in strip form and in which the tread extends over the side portions of the tire to be recapped as shown in FIG. 1. If strips manufactured in strip form are placed on the transversely curved outer surface of the tire, to be recapped and about the circumference of the tire, there will be created either a tension in the central portion of the tread which extends about the maximum circumferential length of the tire or a compression at the side portions of the profile which will set up in the tread when applied about the circumference of the tire undue stresses which will detrimentally affect the wearing quality of the tread and/or the bond between tread and tire.

This difficulty in the application of strip-shaped treads is overcome according to the present invention by providing treads which are constructed in such a manner that the central longitudinal portion of the tread which during wrapping of the tread about the tire are superimposed upon the maximum tire circumference are made expandable whereas the longitudinal edge portions of the tire are constructed in such a manner so as to maintain their length during wrapping of the tread about the tire, or the treads according to the present invention are constructed in such a manner that the central longitudinal portion will maintain its length during wrapping of the tread about the tire, whereas the lateral edge portions of the tread can be contracted.

According to the present invention the difference in length between the central portion and the longitudinal side portions of the strip-shaped tread may be compensated for by forming of folds in the tread strip extending spaced from each other and transversely to the elongation of the strip, which have their greatest widths at the central portion of the tread and which decrease in width toward the opposite edge portions thereof. The folds are dimensioned in such a manner that during wrapping of the strip about the transversely curved outer tire surface the difference between the circumferential length of the central portion of the tire and the side portions thereof are compensated so that the tread can be applied to the outer tire surface without creating undue tensions in the tread.

In a profiled tread which has spaced projections connected by a web or base portion, the folds may be arranged in the web portion and may extend upwardly between the projections or downwardly below the bottom surface of the web.

Instead of expanding the central portion of the tread strip, it is also possible to shorten or compress the opposite edge portions thereof and for this purpose, the web portion of the profiled tread may be formed with cutouts extending from the bottom surface of the tread into the web portion transverse to the longitudinal direction of the tread and each tapering from the longitudinal edge portion of the tread toward the center region thereof, which cutouts will be at least partly closed during wrapping of the tread about the tire surface.

It is also possible to provide for the necessary expansion of the center portion of the tread by forming a plurality of slits extending from the bottom surface of the tread strip through the web portion thereof into the respective projections which will open at the center portion of the tread during wrapping of the tread about the tire. The thus formed cavities may be filled with binding material and for this purpose appropriate bores may be formed in the projections.

In order to expand or contract the plurality of folds or cutouts in uniform manner during wrapping of the tread about the tire surface, it is preferred according to the present invention to use a pressure roller mounted turnably about an axis parallel to the tire axis and provided about its circumference with radial projections appropriately spaced and formed to mesh with the projections on the profiled tread during wrapping of the tread about the tire surface while the tire and the pressure roller are respectively rotated about their axes.

FIG. 11 schematically illustrates a transverse cross section through part of a tire 1 and a tread 2 applied thereagainst. The radius of the tire in a plane of symmetry normal to the tire axis 18 is $R_1$ which is considerably greater than the radius $R_2$ of the tire adjacent to the side portion thereof. Evidently, the circumferential length of a circle in the plane of symmetry passing through the point $a$ is considerably greater than the circumferential length of a circle passing through the point $b$. This difference between the two circumferential lengths has to be compensated for if a strip-shaped tread is wrapped about the outer tire surface for recapping the same.

FIG. 12 shows a tread strip 40 according to the present invention in which a plurality of folds are respectively formed between the projections 42 of the profiled tread strip. The folds 43 extend upwardly from the web portion 41 and as mentioned above, each of the folds has its greatest width at the center portion of the strip and tapers towards the edge portion thereof. During wrapping of the tread 40 about the outer surface of the tire 1 the folds are stretched as indicated between the projections 42a and 42b so that the central longitudinal portion of the tread is thereby elongated.

FIG. 12a shows a slight modification of the tread strip shown in FIG. 12 and the folds 43' of the tread 40' illustrated in FIG. 12a extend in this case downwardly below the bottom surface of the tread strip.

If it is desired to maintain the length of the central portion of the strip while shortening the length of the edge portions thereof during wrapping of the strip about the tire surface, it is also possible according to the present invention to provide a plurality of spaced cutouts 48 extending through the web portion and into the respective profiles and which respectively taper from the respective outer edge of the tread towards the center portion thereof as best shown in FIG. 13. During application of the tread 49 onto the outer surface, as shown in FIG. 14 the cutouts 48 will be closed as shown in the projections 42'a and 42'b at the right side of FIG. 14. In this case the length of the central portion of the tread strip will be maintained, whereas the length at opposite edge portions of the tread will be contracted.

It is also possible to form in the central portion of each projection 42" of a tread 51 a slit 52 extending upwardly from the bottom surface of the tread into the respective projection, as shown in FIG. 15, so that during application of the tread about the tire surface the slit 52 may be expanded as shown at 54 in FIG. 15 so as to compensate for the necessary greater length at the central portion of the tread during application thereof onto the tire surface. The flanks of the projection 42' may be formed with slight undercuts 53 as shown at the left projection illustrated in FIG. 15 so that after expansion of the slit 52 the flanks will be substantially straight as shown at the right projection in FIG. 15.

The tread according to the present invention may also be formed with bores 56 communicating with the cavities 48 at one end and with the outer tread surface on the other end (FIG. 16) to assure that during closing of the cavities 48, the air originally contained therein may escape therefrom. The cavities may also be at least partly filled with binding material to assure that after contraction the tread portion will be maintained in the contracted position. The bores 56 will also facilitate escape of surplus binding material from the contracted cavities. The tread 55 shown in FIG. 16 has a plurality of cutouts 48 in each projection.

As mentioned above the tread as shown in FIGS. 12-16 is preferably applied against the outer surface by means of a pressure roller as illustrated in FIGS. 12 and 14. The pressure roller 44 is provided at its circumference with a plurality of radially extending projections 45 which are spaced from each other and which are formed with profiles meshing with the profile of the tread so as to uniformly expand the folds 43 as shown in FIG. 12 at the central portion of the strip or to uniformly compress the tread strip at the side portions thereof to close the cutouts 48 as shown in FIG. 14.

During application of the tread strip, the tire and the pressure roller 44 are mounted on an appropriate support, not shown in the drawings, so that the tire may be rotated about its axis 18 whereas the pressure roller is rotated about its axis 46. During such rotation the projections 45 of the pressure roller will mesh with the projections 42, 42' of the tread strip to provide for uniform expansion or uniform contraction of the respective portions of the tread strip. Of course, to apply tread strips with different profiles, that is projections of different contour and spacing, different pressure rollers will have to be used in which the projections 45 are spaced and contoured according to the projections on the tread. Furthermore, the supporting frame for the tire and the pressure roller has to be constructed in such a manner that the distance between the axis 18 of the tire and the axis 46 of the pressure roller may be changed so that treads can be applied properly to tires of different diameter.

After the tread has been properly applied to the outer tire surface, the ends of the tread are provisionally secured to each other in any well known manner, and subsequently the tread is vulcanized to the tire in the manner as set forth in the above mentioned patent or set forth in the copending application. Before applying the tread of the outer tire surface, the latter may also be covered with a layer of binder material.

It will be understood that each of the elements described above, or two or more together, may also find a useful application in other types of treads for recapping tires differing from the types described above.

While the invention has been illustrated and described as embodied in a tread for recapping tires having a transversely curved outer surface, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be secured by Letters Patent is:

1. In a method of recapping a tire having an outer surface of predetermined curvature transverse to the circumference of the tire so that the tire has in a plane of symmetry normal to the tire axis a circumference of greater length than at opposite side portions thereof, the steps of forming a strip-shaped tread with a plurality of contractable and expandable means extending transverse to the longitudinal direction of said strip-shaped tread and substantially equally spaced in said longitudinal direction from each other; and wrapping said tread about said outer surface of said tire while substantially equally expanding in said longitudinal direction each of said means at a portion thereof located in the region of said plane of symmetry to compensate for said greater circumferential length of said tire in said plane.

2. In a method of recapping a tire having an outer surface of predetermined curvature transverse to the circumference of the tire so that the tire has in a plane of symmetry normal to the tire axis a circumference of greater length than at opposite side portions thereof, the steps of forming a strip-shaped tread with a plurality of contractable and expandable means extending transverse to the longitudinal direction of said strip-shaped tread and substantially equally spaced in said longitudinal direction from each other; and wrapping said tread about said outer surface of said tire while substantially equally contracting in said longitudinal direction each of said means at portion thereof respectively covering side portions of said tire to compensate for the smaller circumferential lengths of said tire side portions.

3. In a method of recapping a tire having an outer surface of predetermined curvature transverse to the circumference of the tire so that the tire has in a plane of symmetry normal to the tire axis a circumference of greater length than at opposite side portions thereof, the steps of forming a strip-shaped tread having a web portion and a plurality of projections arranged spaced from each other in the longitudinal direction of said strip-shaped tread and extending transverse to said direction upwardly from said web portion and being each formed with an elongated cutout extending from the bottom surface of said web into the respective projection and transverse to said longitudinal direction and tapering from a longitudinal edge of said tread toward said longitudinal plane of symmetry thereof; partly filling said cutouts with binding material; wrapping said tread about said outer surface of said tire while substantially equally contracting said cutouts in said longitudinal direction at opposite side portions of said tread; and maintaining said cutouts in contracted position by said binding material.

References Cited

UNITED STATES PATENTS

| | | | |
|---|---|---|---|
| 1,488,343 | 3/1924 | Hoffman | 156—128 |
| 1,965,073 | 7/1934 | Ginsberg | 156—96 |
| 2,201,668 | 5/1940 | Kraft | 156—128 |
| 2,345,518 | 3/1944 | Wendel | 156—96 X |
| 2,609,026 | 9/1952 | Luchsinger-Caballero | 156—129 X |
| 2,966,936 | 1/1961 | Schelkmann | 156—129 X |

FOREIGN PATENTS 849,304  9/1952  Germany.

EARL M. BERGERT, Primary Examiner

C. B. COSBY, Assistant Examiner

U.S. Cl. X.R.

152—187; 156—129, 130